United States Patent [19]

Nakagawa

[11] Patent Number: 4,618,663

[45] Date of Patent: Oct. 21, 1986

[54] PROCESS FOR PREPARING α-METHYLSTYRENE-ACRYLONITRILE COPOLYMERS

[75] Inventor: Masao Nakagawa, Kobe, Japan

[73] Assignee: Kanegafuchi Kagaku Kogyo Kabushiki Kaisha, Osaka, Japan

[21] Appl. No.: 535,262

[22] Filed: Sep. 23, 1983

[30] Foreign Application Priority Data

Oct. 1, 1982 [JP] Japan ................... 57-173738

[51] Int. Cl.[4] ................ C08F 4/36; C08F 220/44
[52] U.S. Cl. ..................... 526/232.3; 526/342
[58] Field of Search ........... 526/341, 232.3, 342

[56] References Cited

U.S. PATENT DOCUMENTS

| | | | |
|---|---|---|---|
| 2,455,569 | 12/1949 | Dickey | 526/232.3 |
| 4,131,728 | 12/1978 | Priddy | 526/232.3 |
| 4,200,593 | 4/1980 | van der Loos et al. | 526/342 |
| 4,340,723 | 7/1982 | Duyzings et al. | 526/342 |

FOREIGN PATENT DOCUMENTS 1020297  2/1966  United Kingdom ............ 526/232.3

*Primary Examiner*—Paul R. Michl
*Assistant Examiner*—Peter F. Kulkosky
*Attorney, Agent, or Firm*—Antonelli, Terry & Wands

[57] ABSTRACT

A process for preparing α-methylstyrene/acrylonitrile copolymers by suspension or bulk polymerization of α-methylstyrene and acrylonitrile with or without other vinyl compounds such as styrene, methyl methacrylate, vinyl toluene and t-butylstyrene in the presence of a difunctional organic peroxide, preferably a difunctional organic peroxide having a 10 hour half-life temperature of 60° to 110° C., at a polymerization temperature of 80° to 120° C. The process produces the copolymers having excellent transparency, heat resistance and strength in high conversions in a short time.

14 Claims, No Drawings

PROCESS FOR PREPARING α-METHYLSTYRENE-ACRYLONITRILE COPOLYMERS

BACKGROUND OF THE INVENTION

The present invention relates to a process for preparing α-methylstyrene/acrylonitrile copolymers, and more particularly to a process for preparing a copolymer having excellent transparency, heat resistance and strength in high conversions by copolymerizing α-methylstyrene and acrylonitrile with or without at least one other vinyl compound in the presence of a specific peroxide in a suspension or bulk polymerization manner.

For producing a copolymer having a heat resistance sufficient for practical use by copolymerizing α-methylstyrene, acrylonitrile and at least one of other vinyl compounds copolymerizable therewith such as styrene, methyl methacrylate, vinyl toluene and t-butylstyrene, it is necessary to employ α-methylstyrene in an amount of at least 10% by weight, preferably at least 20% by weight, of the whole monomers to be used to produce a copolymer containing at least 10% by weight, preferably at least 20% by weight, of the α-methylstyrene units.

It is proposed to carry out a suspension or bulk polymerization in the presence of an organic peroxide as a polymerization initiator such as t-butyl perbenzoate, t-butyl peracetate or di-t-butyl peroxide in a process for preparing α-methylstyrene/acrylonitrile copolymers wherein a large amount of α-methylstyrene is employed to produce a copolymer having a good heat resistance from the above-mentioned point of view. However, in a process using such initiators, it is necessary to use a large amount of the initiators regardless of the polymerization temperature. Consequently, the obtained copolymer is very low in the degree of polymerization, namely molecular weight, and is poor in utility as a molding material. On the other hand, in case of using these initiators in a decreased amount for the purpose of raising the degree of polymerization, the productivity is very low, since the so-called dead end polymerization occurs, thus a high conversion as required in industrial production is not obtained, or a very long polymerization time is required when a high conversion is desired.

Also, high conversions are not obtained by the use of a usual organic peroxide such as benzoyl peroxide, even if the polymerization temperature optimum for the peroxide is adopted.

Like this, in a conventional process for the preparation of the α-methylstyrene/acrylonitrile copolymers by suspension or bulk polymerization, the copolymers utilizable as molding materials have not been obtained, or the productivity has been very low.

It is an object of the present invention to provide a process for preparing α-methylstyrene/acrylonitrile copolymers having excellent transparency, heat resistance and strength.

A further object of the invention is to provide a process for preparing α-methylstyrene/acrylonitrile copolymers having excellent properties in high conversions in a short period of time by a suspension or bulk polymerization technique.

These and other objects of the present invention will become apparent from the description hereinafter.

SUMMARY OF THE INVENTION

In accordance with the present invention, there is provided a process for preparing a copolymer which comprises copolymerizing 10 to 80% by weight of α-methylstyrene, 5 to 50% by weight of acrylonitrile and 0 to 70% by weight of at least one member selected from the group consisting of styrene, methyl methacrylate, vinyl toluene and t-butylstyrene in the presence of a difunctional organic peroxide as an initiator at a temperature of 80° to 120° C. in a suspension or bulk polymerization manner.

DETAILED DESCRIPTION

In the present invention, there is employed a monomer mixture consisting of 10 to 80% by weight, preferably 20 to 80% by weight, of α-methylstyrene, 5 to 50% by weight, preferably 10 to 40% by weight, of acrylonitrile and 0 to 70% by weight of at least one member selected from the group consisting of styrene, methyl methacrylate, vinyl toluene and t-butylstyrene.

It is essential to employ difunctional organic peroxides as polymerization initiators. The term "difunctional peroxides" as used herein means peroxides having two —O₂— group capable of producing radicals. Preferably, difunctional organic peroxides having a 10 half-life temperature of 60° to 110° C. are employed in the present invention. The term "10 hour half-life temperature" as used herein means the temperature at which 10 hours are required in reducing the concentration of an initiator by half by the thermal decomposition. Typical examples of the initiators used in the invention are, for instance, di-t-butyl peroxyhexahydroterephthalate, 2,5-dimethyl-2,5-bis(2-ethylhexanoylperoxy)hexane, 1,1-di-t-butylperoxy-3,3,5-trimethylcyclohexane, 1,1-di-t-butylperoxycyclohexane, di-t-butyl peroxyazelate, 2,5-dimethyl-2,5-bis(benzoylperoxy)hexane, 2,2-di(t-butylperoxy)butane, n-butyl ester of 4,4-di-t-butylperoxyvaleric acid, di-t-butyl peroxytrimethyladipate, and the like. In particular, di-t-butyl peroxyhexahydroterephthalate and 1,1-di-t-butylperoxy-3,3,5-trimethylcyclohexane are preferable.

The initiator is employed in an amount of 0.1 to 2.0% by weight, preferably 0.2 to 1.5% by weight, based on the total weight of the monomers used. When the amount of the initiator is less than 0.1% by weight, no industrially practical conversion is obtained, or a very long time is required in polymerization, thus resulting in lowering of productivity. When the amount is more than 2.0% by weight, a copolymer is obtained in high conversions in a short time, but the molecular weight is low and accordingly the strength of moldings made thereof is remarkably lowered.

The fact that the α-methylstyrene/acrylonitrile copolymers of high quality are obtained in high conversions in a very short time by a suspension or bulk polymerization using the specific difunctional organic peroxide has not been expected from conventional knowledges and techniques. However, the reason is unclear.

Known suspension and bulk polymerization techniques are applicable to the process of the present invention. In the case of the suspension polymerization, known dispersing agents are added to an aqueous medium. The dispersing agents include, for instance, organic dispersing agents such as polyvinyl alcohol, polyvinyl pyrrolidone and methyl cellulose, and inorganic dispersing agents such as calcium phosphate, magnesium phosphate, sodium silicate, zinc oxide and magnesium carbonate. In the case of the inorganic dispersing agents, the combination use thereof with anionic surface active agents such as sodium dodecylbenzenesulfonate and sodium α-olefinsulfonates is effective in increasing the dispersing effect.

It is important to select the polymerization temperature. The polymerization is carried out at a temperature of 80° to 120° C., preferably 90° to 110° C. When the temperature is lower than 80° C., the conversion is low, and when the temperature is higher than 120° C., the molecular weight of the produced polymer is lowered and industrially useful copolymers are hard to obtain.

The present invention is more specifically described and explained by means of the following Examples, in which all % and parts are by weight unless otherwise noted.

It is to be understood that the present invention is not limited to the Examples, and various changes and modifications may be made in the invention without departing from the spirit and scope thereof.

In the Examples, the specific viscosity $\eta_{sp}$ was measured at 30° C. with respect to a 0.2% by weight solution of a copolymer in dimethylformamide. It is shown as a measure for the degree of polymerization, namely molecular weight. Also, the properties of a copolymer were measured with respect to a molding prepared by injection molding from the copolymer. The heat deflection temperature was measured according to Japanese Industrial Standard (JIS) K 7207 (deflection temperature under load). The impact strength was measured according to JIS K 7110 (Izot impact strength).

EXAMPLE 1

An autoclave equipped with a stirrer was charged with 110 parts of water, 0.24 part of calcium phosphate, 0.003 part of sodium dodecylbenzenesulfonate and 0.2 part of sodium chloride. To the autoclave were added 50 parts of α-methylstyrene in which 0.3 part of di-t-butyl peroxyhexahydroterephthalate was dissolved, 30 parts of acrylonitrile and 20 parts of styrene with stirring. Immediately, the temperature was elevated to 95° C., and the polymerization was carried out for 7 hours at that temperature. After cooling the reaction mixture to 40° C., the dehydration and drying were conducted to give a copolymer.

The conversion, the specific viscosity of the copolymer and the deflection temperature and impact strength of the molding made of the copolymer are shown in Table 1.

EXAMPLE 2

The procedure of Example 1 was repeated except that 0.5 part of 1,1-di-t-butylperoxy-3,3,5-trimethylcyclohexane was employed instead of 0.3 part of di-t-butyl peroxyhexahydroterephthalate and the polymerization was carried out at 100° C. instead of 95° C.

The results are shown in Table 1.

EXAMPLE 3

The procedure of Example 1 was repeated except that di-t-butyl peroxyhexahydroterephthalate was employed in an amount of 0.5 part.

The results are shown in Table 1.

Comparative Example 1

The procedure of Example 1 was repeated except that 0.3 part of benzoyl peroxide was employed instead of 0.3 part of di-t-butyl peroxyhexahydroterephthalate.

The results are shown in Table 1.

TABLE 1

| | Initiator | | Conversion (%) | Specific viscosity | Deflection temp. (°C.) | Impact strength (kg./cm./cm.) |
| --- | --- | --- | --- | --- | --- | --- |
| | Kind | Amount (part) | | | | |
| Ex. 1 | Di-t-butyl peroxyhexahydroterephthalate | 0.3 | 99.3 | 0.164 | 122 | 1.9 |
| Ex. 2 | 1,1-Di-t-butylperoxy-3,3,5-trimethylcyclohexane | 0.5 | 99.0 | 0.135 | 122 | 1.9 |
| Ex. 3 | Di-t-butyl peroxyhexahydroterephthalate | 0.5 | 99.6 | 0.149 | 120 | 1.9 |
| Com. Ex. 1 | Benzoyl peroxide | 0.3 | 71.5 | — | —* | —* |

*No molding was obtained due to a low degree of polymerization.

EXAMPLE 4

A copolymer was prepared in the same manner as in Example 1 except that 30 parts of α-methylstyrene, 10 parts of acrylonitrile and 60 parts of styrene were copolymerized in the presence of 1 part of di-t-butyl peroxyhexahydroterephthalate. The conversion was 98.2%, thus the copolymer was obtained in a high conversion in a short time. Also, the deflection temperature was 118° C.

Comparative Example 2

The procedure of Example 4 was repeated except that 1.0 part of benzoyl peroxide was employed instead of 1.0 part of di-t-butyl peroxyhexahydroterephthalate was employed and the polymerization was carried out at 90° C. The conversion was very low, namely 42%.

In addition to the ingredients used in the Examples, other ingredients can be used in the Examples as set forth in the specification to obtain substantially the same results.

What is claimed is:

1. A process for preparing a copolymer having improved transparency at high conversion levels which comprises copolymerizing 10 to 80% by weight of α-methylstyrene, 5 to 50% by weight of acrylonitrile and 0 to 70% by weight of at least one member selected from the group consisting of styrene, methyl methacrylate, vinyl toluene and t-butylstyrene in the presence of a difunctional organic peroxide as an initiator at a temperature of 80° to 120° C. in a suspension or bulk polymerization manner.

2. The process of claim 1, wherein said difunctional organic peroxide has a 10 hour half-life temperature of 60° to 110° C.

3. The process of claim 2, wherein said difunctional organic peroxide is di-t-butyl peroxyhexahydroterephthalate or di-t-butylperoxy-3,3,5-trimethylcyclohexane.

4. The process of claim 1, wherein from 20 to 80% by weight of α-methylstyrene and from 10 to 40% by weight of acrylonitrile are copolymerized in the presence of said difunctional organic peroxide as an initiator.

5. The process of claim 1, wherein said difunctional organic peroxide is di-t-butyl peroxyhexahydroterephthalate, 2,5-dimethyl-2,5-bis(2-ethylhexanoylperoxy)hexane, 1,1-di-t-butylperoxy-3,3,5-trimethylcyclohexane, 1,1-di-t-butylperoxycyclohexane, di-t-butyl peroxyazelate, 2,5-dimethyl-2,5-bis(benzoylperoxy)hexane, 2,2-di(t-butylperoxy)butane, n-butyl ester of 4,4-di-t-butylperoxyvaleric acid or di-t-butyl peroxytrimethyladipate.

6. The process of claim 5, wherein the amount of difunctional organic peroxide employed as initiator is from 0.1 to 2.0% by weight based on the total weight of the monomers copolymerized.

7. The process of claim 1, wherein said at least one member is styrene.

8. The process of claim 3, wherein the amount of the difunctional organic peroxide employed as initiator is from 0.1 to 2.0% by weight based on the total weight of the monomers copolymerized.

9. A process for preparing a copolymer having improved transparency at high conversion levels which comprises copolymerizing a mixture of monomers containing 10 to 80% by weight of α-methylstyrene, 5 to 50% by weight of acrylonitrile and 0 to 70% by weight of at least one monomer selected from the group consisting of styrene, methyl methacrylate, vinyl toluene and t-butyl styrene in the presence of from 0.1 to 2.0% by weight of a difunctional organic peroxide as an initiator based on the total weight of the monomers copolymerized in said mixture, said mixture of monomers being copolymerized at a temperature of 80° to 120° C. in a suspension or bulk polymerization system.

10. The process of claim 9, wherein 50% by weight of α-methylstyrene, 30% by weight of acylonitrile and 20% by weight of styrene are copolymerized in the presence of an initiator selected from the group consisting of di-t-butyl peroxyhexahydroterephthalate and di-t-butyl peroxy-3,3,5-trimethylcyclohexane.

11. The process of claim 9, wherein 30% by weight of α-methylstyrene, 10% by weight of acrylonitrile and 60% by weight of styrene are copolymerized in the presence of di-t-butyl peroxyhexahydroterephthalate.

12. The process of claim 9, wherein said difunctional organic peroxide is di-t-butyl peroxyhexahydroterephthalate, 2,5-dimethyl-2,5-bis(2-ethylhexanoylperoxy)hexane, 1,1-di-t-butylperoxy-3,3,5-trimethylcyclohexane, 1,1-di-t-butylperoxycyclohexane, di-t-butyl peroxyazelate, 2,5-dimethyl-2,5-bis(benzoylperoxy)hexane, 2,2-di(t-butylperoxy)butane, n-butyl ester of 4,4-di-t-butylperoxyvaleric acid or di-t-butyl peroxytrimethyladipate.

13. The process of claim 9, wherein said difunctional organic peroxide has a 10 hour half-life temperature of 60° to 110° C.

14. The process of claim 13, wherein said difunctional organic peroxide is di-t-butyl peroxyhexahydroterephthalate or di-t-butylperoxy-3,3,5-trimethylcyclohexane.

* * * * *